United States Patent [19]
Capshew

[11] 3,918,177
[45] Nov. 11, 1975

[54] ARITHMETIC FACT TEACHING DEVICE

[76] Inventor: Ruth E. Capshew, 915 Maxwell Lane, Bloomington, Ind. 47401

[22] Filed: June 18, 1974

[21] Appl. No.: 480,538

[52] U.S. Cl................................................ 35/31 R
[51] Int. Cl.² ......................................... G09B 19/02
[58] Field of Search.......... 35/31 R, 31 A, 31 C, 74, 35/9 R, 9 E, 5; 197/102

[56] References Cited
UNITED STATES PATENTS

| | | | |
|---|---|---|---|
| 375,095 | 12/1887 | Pollard.................................. | 35/74 |
| 662,834 | 11/1900 | Tcherkassov ....................... | 197/102 |
| 1,356,929 | 10/1920 | Lewers................................... | 35/39 |
| 1,560,020 | 11/1925 | Curley................................... | 35/5 |
| 1,593,686 | 7/1926 | Barnes ................................. | 35/35 R |
| 1,617,831 | 2/1927 | Wolke............................. | 35/31 A X |
| 1,619,849 | 3/1927 | Brittingham .................... | 35/31 A X |
| 2,482,227 | 9/1949 | Towne .............................. | 35/35 H |
| 2,591,327 | 4/1952 | Witter et al..................... | 35/31 A X |
| 2,706,862 | 4/1955 | Fanning ........................... | 35/31 R X |
| 3,024,540 | 3/1962 | Orth................................... | 35/31 A |
| 3,087,258 | 4/1963 | Anderson.......................... | 35/31 R |
| 3,289,324 | 12/1966 | Benson ............................ | 35/31 A |
| 3,541,707 | 11/1970 | Billingsley........................ | 35/31 A |
| 3,624,928 | 12/1971 | Felton............................... | 35/31 A |

*Primary Examiner*—Wm. H. Grieb
*Attorney, Agent, or Firm*—Woodard, Weikart, Emhardt & Naughton

[57] ABSTRACT

A base member is provided with a circular groove receiving replaceable ring members therein, each ring member having a different array of circularly spaced numbers. An aperture at the geometrical center of the ring receives any one of a number of removable plugs, each plug having a different integer marked on the upper face thereof. A circular array of spaced apertures between the groove and the central aperture, receives plugs, each having a number thereon, typically in sequence from zero to nine from the first to the last plug of this array. The numbers on the ring received in the circular groove represent the result of an arithmetic operation involving the number on the central plug, and the number on the plug in radial alignment with the number on the ring. Caps are provided for the plugs to cover the numbers thereon for certain types of exercises, and a shield ring, with a single, number-exposing aperture is employed over the number bearing ring and rotatable thereon to selectively expose any one of the numbers on the ring.

10 Claims, 6 Drawing Figures

ARITHMETIC FACT TEACHING DEVICE

BACKGROUND OF THE INVENTION

1. Field of the Invention

This invention relates generally to teaching devices, and more particularly to a device employing a number of plugs and rings with various arrangements of numbers obtainable thereby and thereon, to exhibit various arithmetic facts.

2. Description of the Prior Art

Various prior art games and teaching devices are known. Examples are disclosed in U.S. patents as follows:

| | | |
|---|---|---|
| 1,619,849 | Brittingham | March 8, 1927 |
| 1,617,831 | Wolke | Feb. 15, 1927 |
| 2,482,227 | Towne | Sept. 20, 1949 |
| 2,591,327 | Witter | April 1, 1952 |
| 3,024,540 | Orth | March 13, 1962 |
| 3,087,258 | Anderson | April 30, 1963 |
| 3,289,324 | Benson | Dec. 6, 1966 |
| 3,541,707 | Billingsley | Nov. 24, 1970 |
| 3,624,928 | Felton | Dec. 7, 1971 |

These patents make it evident, that various approaches to number games and teaching devices are well known and patented, I believe there is and remains a need for an inexpensive device which is simple to construct and to use, and yet provides considerable versatility for teaching arithmetic facts, review and study thereof, and even examination thereon. I believe the present invention meets this need.

SUMMARY OF THE INVENTION

Described briefly, in a typical embodiment of the present invention, a base member has provision therein for reception of rings having numbers thereon in circularly spaced relationship, such rings being useful one-at-a-time for arithmetic operations to be performed with the device. A circular array of members having numerals thereon is provided within the ring, and a similar unit having a numeral thereon is provided at the geometric center of the array. These units can be rearranged insofar as the numbers presented are concerned, for different combinations of numbers in the use of the device. Cover means in the form of caps for the numerals, and a movable shield for the array of numbers on a ring, are provided for teaching, practice, study and examination, if desired.

DESCRIPTION OF THE PREFERRED EMBODIMENT

Figure 1:
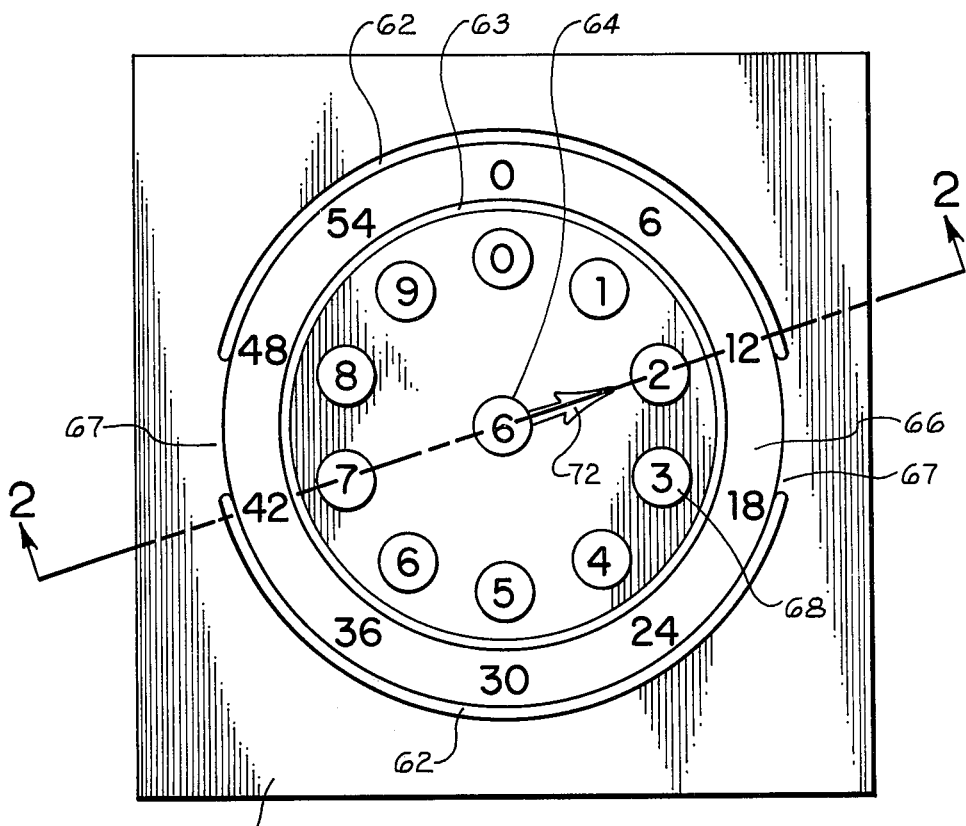
FIG. 1 is a top plan view of a typical embodiment of the present invention with an answer ring installed, and with the various numeral bearing plugs in place, and a particular one at the center corresponding to the numbers on the answer ring, so the answer ring numbers represent results of a multiplication operation.
Figure 2:
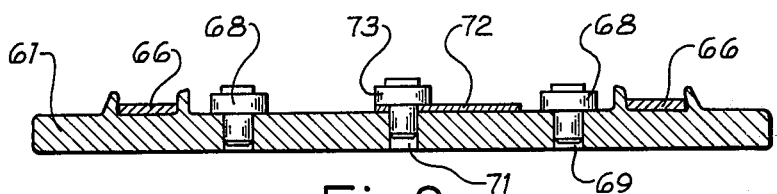
FIG. 2 is a section taken at line 2—2 in FIG. 1 and viewed in the direction of the arrows.

Referring now to the drawings in detail, wherein any of a variety of materials can be represented, but which show a device readily made from plastic, there is a base member 61 which has upstanding circular ribs 62 and 63 thereon forming a track or groove therebetween, the center of the ribs being at 64. A removable answer ring 66 (FIGS. 1 through 4) is received in the track, and in view of the fact that the ring is intended to remain stationary, it is preferred that it be snug in the track. A way of accomplishing this is to have the outer rib 62 inclined slightly inwardly so that the ring 66 is snapped into place in the track. The discontinuities 67 in the outer rib 62 enable reception of fingertips or fingernails under the ring to facilitate removal thereof from the track, when desired.

Plugs or pegs 68 are snugly received in holes 69 (FIGS. 2 and 4), these holes being disposed in circularly spaced relationship around the center 64, and between the central hole 71 and the track. Each of these outer pegs has a raised numeral on the top thereof, the numerals typically being integers. A pointer 72 is received around the shank of the central peg 73 and is rotatable around it to point to any one of the pegs in the circular array.

Figure 4:
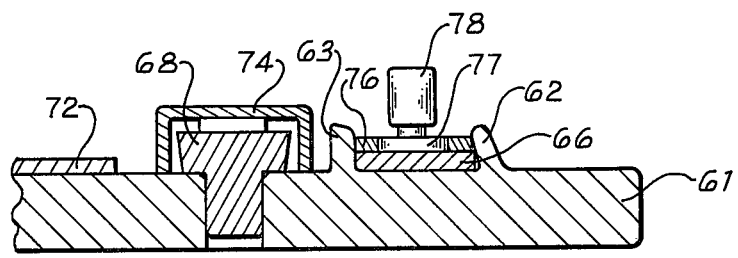
FIG. 4 is an enlarged fragmentary section taken at line 4—4 in FIG. 3 and viewed in the direction of the arrows.
Figure 3:
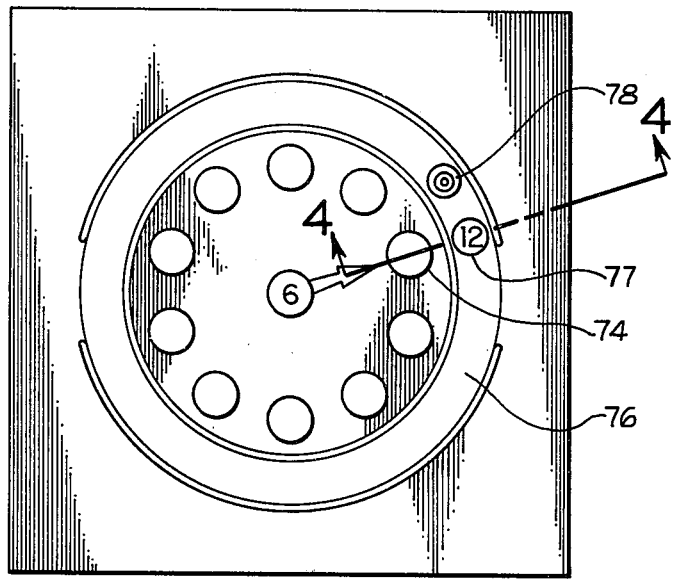
FIG. 3 is a plan view with shield caps covering the plugs in the circular array, and with a shield ring covering the answers on the answer ring, and exposing only the answer "12".
Figure 5:
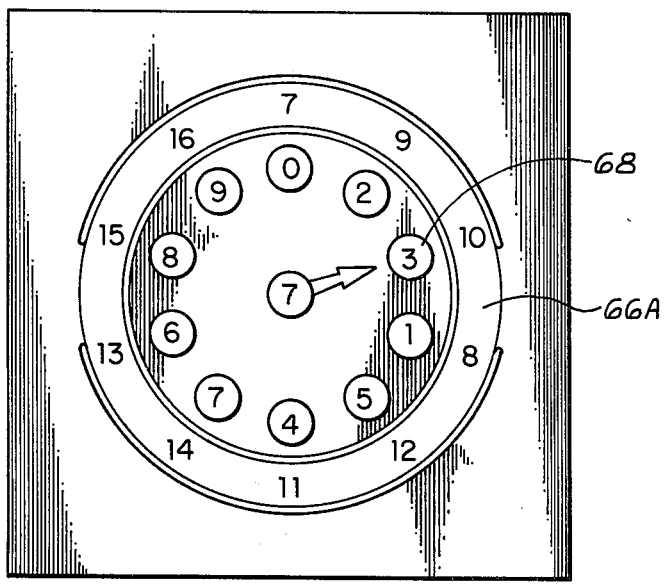
FIG. 5 is a plan view similar to FIG. 1, but showing a different answer ring and a different arrangement of plugs in the circular array, and a different plug in the central aperture.

Referring now to FIGS. 3 and 4, the numerals on the pegs in the circular array are hidden by caps 74 received thereon. In addition, a shield ring or cover 76 has been snapped into the track on top of the ring 66. The shield ring has a single aperture 77 therein which happens to expose the number 12 on the answer ring 66 below it. A rotatable knob 78 is mounted to the shield ring to facilitate manual gripping thereof and rotating the shield ring about the center 64, either clockwise or counterclockwise, for exposing different ones of the numbers appearing on the answer ring, one-at-a-time. It is desirable that the answer ring 66 fit more snugly in the track, than the shield ring 76, because the latter is intended to be rotatable in the track, whereas the former is to remain stationary. The plugs 68 should fit snugly in the apertures. Likewise, the plug 64 should fit snugly in the central aperture. It will be seen that for purposes of use of this invention for the variety of exercises possible thereon, it will be desirable to have additional plugs for the central aperture, each bearing a different integer thereon from zero through nine. Similarly, a set of additional answer rings should be provided, the number and nature depending upon the type of operations to be performed, and the arrangement of the plugs in the circular array. For example, as shown in FIG. 5, the plugs 68 are shown in a different sequence in the circle. The plug in the central aperture has the numeral "7" thereon. The numerals appearing on the answer ring 66A represent the results of addition, in contrast to answer ring 66 of FIG. 1 which bears numerals representing the result of multiplication.

Figure 6:
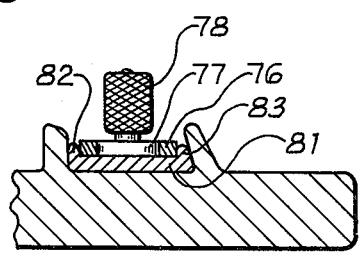
FIG. 6 is a section similar to FIG. 4 but showing a different construction of answer ring cross section.

Other types of construction of the answer ring or base member can be employed. For example, as shown in FIG. 6, which is a section similar to FIG. 4, the answer ring 81 has upwardly projecting beads 82 and 83 on the inner and outer edges thereof. These serve to provide a track for the cover 76. The cover can be turned freely in the track, while the answer ring 81 remains snugly snapped into the base track.

Example of dimensions for useful embodiments are as follows:

| Inside Diameter of Track | Outside Diameter of Track | Plug Head Diameter |
|---|---|---|
| 3" | 5" | ½" |
| 4½" | 7½" | ¾" |
| 6" | 10" | 1" |
| 9" | 15" | 1½" |
| 12" | 20" | 2" |
| 15" | 25" | 2½" |
| 18" | 30" | 3" |

OPERATION

In the use of the device, the base member, together with pointer and 20 pegs (using eleven pegs at a time) can be used by itself for practice and drill. Preferably this would be done with another person checking the answers given. The answer ring would not be used in this instance. The center peg may be changed from zero-nine to practice with any one number. The outer pegs are normally arranged in clockwise fashion from zero to nine for beginning to learn the facts for a particular number. After these facts are learned, it is helpful to rearrange the outer pegs and practice with the numbers out of sequence, (FIG. 5, for example). The pointer is moved to the desired fact, and the answer is given.

Where an answer ring is used, it will have a set of numbers thereon corresponding to the intended arithmetic operation with a given center peg. The outer pegs must be arranged in a sequence corresponding to the sequence in which the answers are given. Accordingly, if increasing answers for multiplication operations are in a clockwise sequence as in the FIG. 1 example, the outer pegs must be arranged in increasing values in a clockwise sequence. By using the desired center number and the proper answer ring, the student can practice the facts for any number, and learn number sequences and relationships.

The cover 76 fits into the track over the answer ring for self study and practice. It is snapped into the track and turned around the track to the proper position to check answers.

To use the device for subtraction or division for any number being studied, the pegs must be arranged in a clockwise sequence if the answers on the answer rings are in a clockwise sequence. Accordingly, the desired numbered peg is placed in the center, and the proper answer ring is placed in position. Caps are placed over the numbers on the outer ring of pegs for the unknown factors. As answers are given by the students, the caps may be removed to check answers. These caps may also be used with answer rings over numbers to find unknown factors for addition and multiplication.

This device can also be used as a game for two children, by giving points for correct answers. For example, one child gives answers until one is missed. Then the other has a turn, giving answers until one is missed. Total points are added to find the winner. Points may be given using the center number as a basis. For example: if the center factor is 3, and the child correctly answers 3 × 7, he would get three points. The center factor would determine the number of points.

It will be recognized that various other arrangements of answers and values of answers can be employed, and various techniques of use of the device can be employed and that it very well meets a real need in this field.

The invention claimed is:

1. An arithmetic fact teaching device comprising:
a base member having a circular track thereon;
a first ring means removably secured in said track and having thereon a plurality of numbers arranged in circularly spaced relationship;
a plurality of apertures in said base, said apertures being circularly spaced inside said track and radially aligned with the numbers in said track;
a central aperture in said base at the center of the circle of said track;
a plurality of plug means received in said plurality of apertures and in said central aperture, each of said plurality of plug means having a number thereon;
and a movable cover on at least one of said plurality of plug means to hide the number thereon.

2. An arithmetic fact teaching device comprising:
a base member having a circular track thereon;
a first ring means removably secured in said track and having thereon a plurality of numbers arranged in circularly spaced relationship;
a plurality of apertures in said base, said apertures being circularly spaced inside said track and radially aligned with the numbers in said track;
a central aperture in said base at the center of the circle of said track;
a plurality of plug means received in said plurality of apertures and in said central aperture, each of said plug means having a number thereon; and
a second ring superimposed on said first ring means and hiding numbers thereon and having an aperture therein sized to expose the numbers of said first ring means one at a time;
said second ring being rotatable on said track to bring the aperture therein in registry with different ones of the numbers on said first ring means, one at a time.

3. The device of claim 2 and further comprising:
a plurality of caps received on plugs of said plurality of plug means except the plug in said central aperture.

4. The device of claim 2 wherein:
said base has retainer means thereon retaining said second ring in said track as said second ring is rotated in said track to expose different ones of said numbers on said first ring means.

5. The device of claim 4 wherein:
said second ring has a manual gripping knob thereon to facilitate rotation thereof.

6. The device of claim 4 and further comprising:
a pointer at said central aperture and rotatable to point to one of said circularly spaced apertures at a time.

7. The device of claim 6 wherein:
the plug in said central aperture has an integer thereon;
the plugs in said circularly spaced apertures have integers thereon from zero to nine.

8. The device of claim 7 wherein:
the numbers on said first ring means are arranged to express the result of arithmetic operation involving the integer on the plug in said central aperture and the integer on the plug lying on the radius from said central aperture to the number on the first ring means.

9. The device of claim 8 wherein:
the numbers of said first ring means represent the result of multiplication of the integer on the plug in the central aperture by the integer on the plug in the circularly spaced aperture in radial alignment therewith.

10. The device of claim 9 and further comprising:
a plurality of additional rings having circularly spaced numbers thereon differing in value and arrangement from the numbers of the first ring means for providing answers to different arithmetic operations involving numbers in said plugs and different numbered plugs in said central aperture.

* * * * *